United States Patent [19]

Ishino et al.

[11] Patent Number: 4,476,257

[45] Date of Patent: Oct. 9, 1984

[54] MAGNETIC COATING COMPOSITION OF PARTIALLY OXIDIZED NITROCELLULOSE AND MAGNETIC POWDER

[75] Inventors: Teiichi Ishino; Ikuo Ueda; Rikiya Kai, all of Miyazaki, Japan

[73] Assignee: Asahi Kasei Kogyo Kabushiki Kaisha, Osaka, Japan

[21] Appl. No.: 469,477

[22] Filed: Feb. 24, 1983

[51] Int. Cl.$^3$ ............................................... G11B 5/70
[52] U.S. Cl. ...................................... 523/181; 524/31; 524/32; 427/128; 428/900; 428/532; 428/425.9; 252/62.54
[58] Field of Search .................. 523/174, 181; 524/31, 524/32; 427/128; 428/900, 532, 425.9, 480; 252/62.54

[56] References Cited

U.S. PATENT DOCUMENTS

| 4,020,236 | 4/1977 | Aonuma et al. | 252/62.54 |
| 4,356,232 | 10/1982 | Tadokoro et al. | 252/62.54 |
| 4,363,850 | 12/1982 | Yasui et al. | 252/62.54 |

OTHER PUBLICATIONS

*Progress in Organic Coatings,* 10 (1982) pp. 195–204.
*Encyclopedia of Polymer Science and Technology,* vol. 3, pp. 313–315.
Catalog of Nitrocelluloses–Asahi Kasei Kogyo K.K.
*Macromolecules,* vol. 13 (1980) pp. 74–79.
*Encyclopedia of Chemical Technology,* 2nd Edition, pp. 625–629.

*Primary Examiner*—John Kight
*Assistant Examiner*—Nathan M. Nutter
*Attorney, Agent, or Firm*—Sughrue, Mion, Zinn, Macpeak & Seas

[57] ABSTRACT

A magnetic coating composition used for producing magnetic recording media is disclosed. The composition is comprised of partially oxidized nitrocellulose and magnetic fine powder or magnetic metal fine powder. The composition may also include a synthetic resin binder. The partially oxidized nitrocellulose has a nitrogen content of 8.0 to 12.5% and contains 2.0 to 100 mmol of carboxyl group per 100 g of nitrocellulose. Use of the partically oxidized nitrocellulose gives increased ability to disperse the magnetic powder within the composition and does not adversely effect the adhesion between the composition and the support.

11 Claims, No Drawings

MAGNETIC COATING COMPOSITION OF PARTIALLY OXIDIZED NITROCELLULOSE AND MAGNETIC POWDER

FIELD OF THE INVENTION

The present invention relates to a magnetic coating composition for magnetic recording media such as video tape, audio tape, and magnetic cards.

BACKGROUND OF THE INVENTION

Magnetic coating compositions now in use are generally composed of magnetic fine powder or magnetic metal fine powder such as $\gamma\text{-Fe}_2\text{O}_3$ and Fe, synthetic resin binder, dispensant, lubricant, and organic solvent. As the synthetic resin binder, nitrocellulose is commonly used because of its abilities to disperse the magnetic powder therein and to provide an adequately hardened layer. Recently, there has arisen a demand for sophisticated magnetic recording media having a higher recording density than before. It is now apparent that conventional nitrocellulose is insufficient with respect to its ability to disperse the magnetic powder to meet such a demand.

SUMMARY OF THE INVENTION

The present inventors carried out substantial researches on the relation between the structure of nitrocellulose and the dispersion of magnetic fine powder or magnetic metal fine powder. As a result of their research they found that partially oxidized nitrocellulose having a nitrogen content of 8.0 to 12.5% and containing 2.0 to 100 mmol of carboxyl groups per 100 g of nitrocellulose exhibits marked ability to disperse magnetic fine power or magnetic metal fine powder.

An object of the present invention is to provide a novel magnetic coating composition having an excellent dispersibilty of magnetic fine powder or magnetic metal fine powder.

DETAILED DESCRIPTION OF THE PREFERRED EMBODIMENTS

The partially oxidized nitrocellulose used in this invention should have the nitrogen content of 8.0 to 12.5%, preferably 10.0 to 12.2%, and contain 2.0 to 100 mmol, preferably 3.0 to 20 mmol, of carboxyl groups per 100 g of nitrocellulose. If the nitrogen content is less than 8.0%, the partially oxidized nitrocellulose is low in solubility in organic solvents such as methyl ethyl ketone, methyl isobutyl ketone, ethyl acetate, toluene and tetrahydrofuran which are commonly used for magnetic coating materials. Further, the nitrocellulose will not exhibits its inherent ability to disperse magnetic fine powder or magnetic metal fine powder. If the nitrogen content is more than 12.5%, the nitrocellulose not only has low solubility in organic solvent such as ethyl acetate, but also it increases the danger of fire. In view of the solubility in organic solvents such as acetates and ketones and the safety in handling, the nitrogen content is particularly preferably within the range of from 10.0 to 12.2%.

If the carboxyl group content is less than 2.0 mmol per 100 g of nitrocellulose, the ability to disperse magnetic fine powder or magnetic metal fine powder is not sufficient. If the carboxyl group content is more than 100 mmol 100 g of nitrocellulose, when dissolved in an organic solvent, viscosity of the resulting solution markedly increases presumably due to crosslinking of the carboxyl groups between the molecules. Therefore it becomes difficult to disperse the magnetic powder. Concerning the dispersibility of magnetic powder and the viscosity, the carboxyl group content is particularly preferably within the range of from 3.0 to 20 mmol per 100 g of nitrocellulose.

The carboxyl group content is determined as follows: Accurately weigh about 1.5 g of partially oxidized nitrocellulose into a 100-ml Erlenmeyer flask. Add about 50 ml of a 0.1 N HCl aqueous solution. Shake and allow to stand for about 2 hours. Filter the contents and wash the partially oxidized nitrocellulose with deionized water thoroughly until the washings become completely neutral. Place the washed partially oxidized nitrocellulose in a beaker together with a small amount of water. Add 50 ml of a 0.05 M aqueous solution of calcium acetate to the beaker. Shake and allow to stand overnight. Take 20 ml of the supernatant liquid from the beaker, and titrate with a 0.01 N NaOH aqueous solution using phenolphthalein indicator. Perform the blank test for 20 ml of a 0.05 M calcium acetate aqueous solution. Calculate the carboxyl group content according to the following formula.

Carboxyl Group Content =

$$\frac{\text{NaOH titrated (ml)} - \text{NaOH titrated in blank test (ml)}}{20} \times \frac{\text{quantity of water*(g)} + 50}{\text{sample weight}}.$$

*water: placed in a beaker together with the washed partially oxidized nitrocellulose The partially oxidized nitrocellulose is usually prepared by oxidizing nitrocellulose or by oxidizing raw material cellulose and then subjecting the oxidized cellulose to nitrification.

The oxidation of nitrocellulose is accomplished by adding, with heating to 20° to 100° C., an oxidizing agent such as nitrogen oxides, hypochlorous acid, chlorous acid, chloric acid, perchloric acid, permanganic acid, dichromic acid or hydrogen peroxide to an aqueous slurry of nitrocellulose or a solution of a nitrocellulose dissolved in an organic solvent such as ketones, preferably acetone, methyl ethyl ketone, and methyl isobutyl ketone. Of the oxidizing agents, nitrogen oxides and hypochlorous acid are preferably used. The oxidation with nitrogen oxides can be performed either by externally introducing nitrogen oxides into the reaction system or by generating nitrogen oxides in the reaction system e.g., utilizing the reaction as follows:

$$4HNO_3 + Cu \rightarrow Cu(NO_3)_2 + 2H_2O + 2NO_2$$

The nitrification of oxidized cellulose is accomplished as follows: Cellulose raw material is made into an aqueous slurry. Examples of cellulose raw material include cotton linter, wood pulp, cotton, hemp and jute, and cotton linter and wood pulp are preferably used.

The slurry is heated to 20° to 100° C. together with the oxidizing agent described above to give partially oxidized cellulose. The partially oxidized cellulose thus prepared is then nitrified with nitric acid or nitric acid/sulfuric acid mixture to give partially oxidized nitrocellulose.

Any conventional magnetic fine powders or magnetic metal fine powders used in magnetic recording media can be used in the present invention. Examples of magnetic fine powder include γ-Fe$_2$O$_3$, Fe$_3$O$_4$, Co-containing γ-Fe$_2$O$_3$, Co-containing Fe$_3$O$_4$, Co-coated Fe$_2$O$_3$, Co-containing FeOx (x : $1.33 < x < 1.5$) and CrO$_2$. Examples of magnetic metal fine powder include Fe, F—Co, F—Co—Ni and Co—Ni—P. The magnetic powders have generally the axis ratio (long axis/short axis) of 5/1 to 15/1 and the long axis of 0.1 to 2 microns.

The partially oxidized nitrocellulose alone exhibits satisfactory dispersion of magnetic fine powder or magnetic metal fine powder, but it may be incorporated with a synthetic resin binder for improved adhesion to a substrate to be coated. The weight ratio of the partially oxidized nitrocellulose to the synthetic resin binder is generally from 0.1/1 to 4/1 depending on the type of magnetic recording media (e.g., magnetic discs, audio tape, video tape, etc.) and the kind of magnetic powder used. The synthetic resin binder preferably has a molecular weight of 2,000 to 100,000.

Examples of useful synthetic resin binders are described below: polyurethane resins including polyester polyurethane resins and polyether polyurethane resins, prepared by reacting polyester polyol and/or polyether polyol with tolylene diisocyanate, diphenylmethane diisocyanate or hexamethylene diisocyanate; vinyl chloride/vinyl acetate copolymers including vinyl chloride/vinyl acetate copolymer, vinyl chloride/vinyl acetate/maleic acid copolymer, and vinyl chloride/vinyl acetate/vinyl alcohol copolymer; acrylic resins including acrylic ester/acrylonitrile copolymer, acrylic ester/styrene copolymer, acrylic ester/vinylidene chloride copolymer, methacrylic ester/acrylonitrile copolymer, methacrylic ester/styrene copolymer and methacrylic ester/vinylidene chloride copolymer; nitrile rubber including vinylidene chloride/acrylonitrile copolymer and butadiene/acrylonitrile copolymer; epoxy resins; phenoxy resins; and ordinary nitrocellulose. Of these, polyurethane resins and vinyl chloride/vinyl acetate/vinyl alcohol copolymer are particularly preferred. It is also preferred to use polyisocyanate prepolymers in combination with polyurethane resins and/or vinyl chloride/vinyl acetate/vinyl alcohol copolymer.

The weight ratio of the magnetic fine powder or magnetic metal fine powder to the partially oxidized nitrocellulose or the total of partially oxidized nitrocellulose and synthetic resin binder is 15/1 to 1.5/1 by weight, preferably 10/1 to 2/1, depending on the type of magnetic recording media to be produced from the magnetic coating composition.

The magnetic coating composition of the present invention may further contain various additives such as dispersants, lubricants abrasives and antistatic agents. The weight ratio of each additive to the magnetic fine powder or magnetic metal fine powder is generally from 0.001/1 to 0.1/1

The magnetic coating composition of this invention is prepared in the same manner as for the ordinary magnetic coating composition as described in e.g., Shigezo Tochihara, *Progress in Organic Coatings*, vol. 10, pp. 195-204 (1982). For example, the magnetic coating composition is prepared by thoroughly mixing partially oxidized nitrocellulose, magnetic fine powder or magnetic metal fine powder and an organic solvent such as methyl ethyl ketone, methyl isobutyl ketone, ethyl acetate, toluene and tetrahydrofuran in a ball mill. In another method, the magnetic coating composition is further mixed with a synthetic resin binder in a ball mill or kneader. In yet another method, the magnetic coating composition is prepared by thoroughly mixing partially oxidized nitrocellulose, synthetic resin binder, magnetic fine powder or magnetic metal fine powder, and an organic solvent in a ball mill.

The invention will be now described in detail with reference to the following examples, in which "parts" means "parts by weight". However, the scope of the invention is not limited to these examples.

The dispersion of magnetic powder in the magnetic coating material should eventually be evaluated in terms of the electromagnetic conversion characteristic of the resulting magnetic recording media. However, it is known that the electromagnetic conversion characteristic is related with the coating gloss and chroma. Namely, the higher the gloss and the lower the chroma, the better the dispersion of magnetic powder.

PREPARATION EXAMPLE 1

100 parts of HIG 20 seconds-nitrocellulose (a product of Asahi Kasei Kogyo Kabushiki Kaisha) containing 30% of isopropyl alcohol was dissolved in 300 parts of acetone. The solution was placed in an Erlenmeyer flask equipped with a reflux condenser. 4 parts of a 35% hydrogen peroxide solution was added. The flask was heated for 3 hours on a water bath at 70° C. The content was poured into a large amount of water to give partially oxidized nitrocellulose (Sample No. 1). The nitrogen content was 11.20%, and the carboxyl group content was 3.6 mmol per 100 g of nitrocellulose.

PREPARATION EXAMPLE 2

100 parts of purified linter was placed in a desiccator, and 5.8 parts of liquid nitrogen oxide was added thereto. After standing at room temperature for 48 hours, the content was washed with water and dried to give partially oxidized cellulose. This product was then reacted with a mixed acid of H$_2$SO$_4$/HNO$_3$/H$_2$O (59/23/18 by weight to give partially oxidized nitrocellulose (Sample No. 2). The nitrogen content was 10.42%, and the carboxyl group content was 4.8 mmol per 100 g of nitrocellulose.

The above method was repeated, with the quantity of nitrogen oxide changed and the oxidation time changed, to give partially oxidized cellulose, which was then nitrified with above-described mixed acid to give various kinds of partially oxidized nitrocellulose (Sample Nos. 3, 4, C-1 and C-2) as shown in Table 1.

TABLE 1

| Sample No. | Oxidation of Cellulose | | Partially Oxidized Nitrocellulose | |
|---|---|---|---|---|
| | Quantity of NO$_2$ (parts) | Time (hours) | N content (%) | Carboxyl Group Content (mmol/100 g nitrocellulose) |
| 3 | 8.7 | 48 | 10.13 | 6.0 |
| 4 | 11.6 | 48 | 9.48 | 9.4 |
| C-1 | 2.9 | 48 | 10.98 | 1.8 |
| C-2 | 11.6 | 72 | 7.86 | 16.3 |

EXAMPLE 1

The following components were mixed and dispersed in a ball mill for 24 hours.

| | Parts |
|---|---|
| γ-F$_2$O$_3$ (average long axis: 0.5μ) | 300 |
| Partially oxidized nitrocellulose | 70 |

| | Parts |
|---|---|
| (Sample No. 1) | |
| Methyl ethyl ketone | 555 |

The resulting mixture was designated as Magnetic Coating A. Magnetic coating A was applied onto a 20-micron thick polyethylene terephthalate film, followed by drying. Dispersion of the magnetic powder was evaluated in terms of gloss and chroma, and adhesion of the coating layer to the substrate was evaluated in terms of tape peel strength. The results are shown in Table 2.

EXAMPLE 2

500 Parts of Magnetic Coating A obtained in Example 1 was mixed with 38 parts of polyurethane resin (Esten 5703, a product of Goodrich Company) and 57 parts of methyl ethyl ketone in a ball mill for 8 hours. The resulting product was designated as Magnetic Coating B. Magnetic coating B was applied to a 20-micron thick polyethylene terephthalate film, followed by drying. Gloss, chroma, and tape peel strength were measured. The results are shown in Table 2.

EXAMPLE 3

The following components were mixed and dispersed in a ball mill for 24 hours.

| | Parts |
|---|---|
| $\gamma$-$F_2O_3$ (average long axis: 0.5$\mu$) | 300 |
| Partially oxidized nitrocellulose (Sample No. 2) | 30 |
| Polyurethane resin (Esten 5703) | 20 |
| Vinyl chloride/vinyl acetate copolymer (Vinylite VAGH, a product of Union Carbide Corporation) | 20 |
| Methyl ethyl ketone | 400 |
| Toluene | 155 |

The resulting mixture was designated as Magnetic Coating C. Magnetic Coating C was applied onto a 20-micron thick polyethylene terephthalate film, followed by drying. Gloss, chroma, and tape peel strength were measured. The results are shown in Table 2.

EXAMPLE 4

The mixing step in Example 3 was repeated, except that the partially oxidized nitrocellulose was replaced by Sample Nos. 3 and 4. The resulting products were designated as Magnetic Coatings D and E, respectively. They were applied to a 20-micron thick polyethylene terephthalate film, followed by drying. Gloss, chroma, and tape peel strength were measured. The results are shown in Table 2.

EXAMPLE 5

The following components were mixed and dispersed in a ball mill for 48 hours.

| | Parts |
|---|---|
| Magnetic metal fine powder (KM-1000, Toda Kogyo Co., Ltd.) | 300 |
| Partially oxidized nitrocellulose (Sample No. 2) | 30 |
| Nitrile rubber (Nippl 1432, Nippon Geon Co., Ltd.) | 20 |
| Epoxy resin (Epikote, Shell Chemical) | 20 |
| Methyl ethyl ketone | 400 |
| Toluene | 155 |

The resulting mixture was designated as Magnetic Coating F. Magnetic Coating F was applied onto a 20-micron thick polyethylene terephthalate film, followed by drying. Gloss, chroma, and tape peel strength were measured.

The results are shown in Table 2.

EXAMPLE 6

The mixing step in Example 1 was repeated, except that the $\gamma$-$Fe_2O_3$ was replaced by Co-containing $Fe_2O_3$ (average long axis 0.43 $\mu$) and Co-coated $Fe_2O_3$. The resulting products were designated as Magnetic Coatings G and H, respectively. They were evaluated in the same manner as above. The results are shown in Table 2.

EXAMPLE 7

The following components were mixed and dispersed in a ball mill for 24 hours.

| | Parts |
|---|---|
| $CrO_2$ (average long axis: 0.48$\mu$) | 300 |
| Partially oxidized nitrocellulose (Sample No. 1) | 70 |
| Methyl isobutyl ketone | 555 |

The resulting mixture was designated as Magnetic Coating I. 500 parts of Magnetic Coating I was mixed with 10 parts of H1/2 second-nitrocellulose (a product of Asahi Kasei Kogyo K.K.), 10 parts of acrylic resin (Acrydic 7A801, a product of Dainippon Ink & Chemicals, Inc.), 18 parts of polyurethane resin (Nippolan 5033, a product of Nippon Polyurethane Co., Ltd.), and 57 parts of methyl ethyl ketone in a kneader for 5 hours. The resulting product was designated as Magnetic Coating J. The results of evaluation of Magnetic Coatings I and J are shown in Table 2.

COMPARATIVE EXAMPLE 1

Magnetic coating was prepared in the same manner as in Example 1, except that the partially oxidized nitrocellulose was replaced by H48 second-nitrocellulose (a product of Asahi Kasei Kogyo K.K.). Incidentally, the H1/8 second-nitrocellulose had the nitrogen content of 11.7% and contained 1.2 mmol of carboxyl group per 100 of nitrocellulose. The resulting product is designated as Magnetic Coating K. The evaluation results are shown in
Table 2.

COMPARATIVE EXAMPLE 2

Magnetic coating was prepared in the same manner as in Example 3, except that the partially oxidized nitrocellulose was replaced by H1/4 second-nitrocellulose (a product of Asahi Kasei Kogyo K.K.). Incidentally, the H1/4 second-nitrocellulose had the nitrogen content of 11.7% and contained 1.0 mmol of carboxyl group per 100 of nitrocellulose. The resulting product was designated as Magnetic Coating L. The evaluation results are shown in Table 2.

COMPARATIVE EXAMPLE 3

Magnetic coating was prepared in the same manner as in Example 3, except that the partially oxidized nitrocellulose was replaced by Samples Nos. C-1 and C-2. The resulting products were designated as M and N, respectively. The evaluation results are shown in Table 2.

COMPARATIVE EXAMPLE 4

Magnetic coating was prepared in the same manner as in Example 5, except that the partially oxidized nitrocellulose was replaced by H1/8 second-nitrocellulose (a product of Asahi Kasei Kogyo K.K.). The resulting product was designated as Magnetic Coating O. This product was applied onto a 20-micron thick polyethylene terephthalate film, followed by drying. Gloss and tape peel strength were measured. The results are shown in Table 2. <Method for evaluation>

1. Gloss

The gloss of the coating film was measured using a digital variable angle gloss meter at 60°/60°. (made by Suga Shikenki Company). The standard black board was assigned a specular gloss value of 91.5.

2. Chroma

Chroma was obtained by calculating $\sqrt{a^2+b^2}$ for a and b of the coating film measured by a ditital variable angle gloss meter Suga Shikenki Company).

3. Tape peel strength test

Adhesive cellophane tape was pressed down over the coating layer and jerked away to see if the coating layer is peeled off. Further, two sheets of the coated film, with the coating layers facing each other, were rubbed ten times between fingers to see if the coating film was rubbed off.

Fair—No peeling by cellophane tape, but slight peeling by rubbing

Good—No peeling by cellophane tape and no peeling by rubbing

TABLE 2

| | Magnetic Coating | Gloss | Chroma | Tape Peel Strength |
|---|---|---|---|---|
| Example 1 | A | 58% | 16 | Fair |
| Example 2 | B | 52 | 17 | Good |
| Example 3 | C | 62 | 14 | Good |
| Example 4 | D | 64 | 13 | Good |
| | E | 66 | 12 | Good |
| Example 5* | F | 22 | — | Fair |
| Example 6 | G | 57 | 15 | Fair |
| | H | 60 | 14 | Fair |
| Example 7 | I | 61 | 14 | Fair |
| | J | 57 | 15 | Good |
| Comparative Example 1 | K | 28 | 24 | Fair |
| Comparative Example 2 | L | 26 | 24 | Good |
| Comparative Example 3 | M | 36 | 21 | Good |
| | N | 24 | 16 | Good |
| Comparative Example 4* | O | 4 | — | Fair |

*Magnetic metal fine powder was used as the magnetic powder

It is seen from the above results that the partially oxidized nitrocellulose having the nitrogen content of 8.0 to 12.5% and containing 2.0 to 100 mmol of carboxyl group per 100 g of nitrocellulose is far superior to conventional nitrocellulose in the ability to disperse magnetic fine powder or magnetic meal fine powder. Therefore, the magnetic coating composition of this invention is greately improved in disperson of magnetic fine powder or magnetic metal fine powder. It is believed that this invention makes a great contribution to the industry.

While the invention has been describe in detail and with reference to specific embodiments thereof, it will be apparent to one skilled in the art that various changes and modifications can be made therein without departing from the spirit and scope thereof.

What is claimed is:

1. A magnetic coating composition for magnetic recording media, comprising:
    partially oxidized nitrocellulose; and
    a powder selected from the group consiting of magnetic fine powder metal fine powder, said partially oxidized nitrocellulose having a nitrogen content 8.0 to 12.5% and containing 2.0 to 100 mmol of carboxyl group per 100 g of nitrocellulose.

2. A magnetic coating composition for magnetic recording media as claimed in claim 1, further comprising a synthetic resin binder.

3. A magnetic coating composition for magnetic recording media as claimed in claim 1, where in the weight ratio of the powder to the partially oxidized nitrocellulose is within the range of 15/1 to 1.5/1.

4. A magnetic coating composition for magnetic recording media as claimed in Claim 3, wherein the weight ratio of the powder to the partially oxidized nitrocellulose is within the rangee of 10/1 to 2.1.

5. A magnetic coating composition for magnetic recording media as claim in claim 2, wherein the weight ratio of the partially oxidized nitrocellulose to the synthetic resin binder is from 0.1/1 to 4/1.

6. A magnetic coating composition for magnetic recording media as claim 5, wherein the weight ratio of the power to the total of partially oxidized nitrocellulose and synthetic resin is within the range of 15/1 to 1.5/1.

7. A magnetic coating composition for magnetic recording media as claimed in claim 6, wherein the weight ratio of the powder to the total of partially oxidized nitrocellulose and synthetic resin is within the range of 10/1 to 2/1.

8. A magnetic coating composition for magnetic recording media as claimed in claim 1, wherein the magnetic fine powder is selected from the group consisting of $\gamma\text{-Fe}_2\text{O}_3$, $\text{Fe}_3\text{O}_4$, Co-containing $\gamma\text{-Fe}_2\text{O}_3$, Co-containing $\text{Fe}_3\text{O}_4$, Co-coated $\text{Fe}_2\text{O}_3$, Co-containing $\text{FeO}_x$ ($x: 1.33 < x < 1.5$) and $\text{CrO}_2$.

9. A magnetic coating composition for magnetic recording media as claimed in claim 1, wherein the magnetic metal powder is selected from the group consisting of Fe, Fe-Co, Fe-Co-Ni and Co-Ni-P.

10. A magnetic coating composition for magnetic recording media as claimed in claim 1, wherein the partially oxidized nitrocellulose has the nitrogen content of 10.0 to 12.2% and contains 3.0 to 20 mmol of carboxyl group per 100 g of nitrocellulose.

11. A magnetic coating composition for magnetic recording media as claimed in claim 2, wherein the partially oxidized nitrocellulose has the nitrogen content of 10.0 to 12.2% and containes 3.0 to 20 mmol of carboxyl group per 100 g of nitrocellulose.

* * * * *